US009703492B2

(12) United States Patent
Liao et al.

(10) Patent No.: US 9,703,492 B2
(45) Date of Patent: Jul. 11, 2017

(54) PAGE REPLACEMENT ALGORITHMS FOR USE WITH SOLID-STATE DRIVES

(71) Applicant: International Business Machines Corporation, Armonk, NY (US)

(72) Inventors: Mengze Liao, Shanghai (CN); Jiang Yu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 14/715,632

(22) Filed: May 19, 2015

(65) Prior Publication Data
US 2016/0342529 A1    Nov. 24, 2016

(51) Int. Cl.
| | | |
|---|---|---|
| G06F 12/00 | (2006.01) | |
| G06F 13/00 | (2006.01) | |
| G06F 3/06 | (2006.01) | |
| G06F 12/123 | (2016.01) | |

(52) U.S. Cl.
CPC ............ *G06F 3/0611* (2013.01); *G06F 3/065* (2013.01); *G06F 3/0619* (2013.01); *G06F 3/0652* (2013.01); *G06F 3/0679* (2013.01); *G06F 3/0685* (2013.01); *G06F 12/123* (2013.01); *G06F 2212/69* (2013.01)

(58) Field of Classification Search
CPC .............................. G06F 12/123; G06F 12/124
USPC ......................................................... 711/136
See application file for complete search history.

(56) References Cited

U.S. PATENT DOCUMENTS

| 6,078,993 | A | 6/2000 | Iwata et al. |
| 7,287,122 | B2 | 10/2007 | Rajamony et al. |
| 7,774,556 | B2 * | 8/2010 | Karamcheti .......... G06F 9/5016 |
| | | | 711/146 |
| 8,352,195 | B2 | 1/2013 | Palmer et al. |
| 8,484,405 | B2 | 7/2013 | Mashtizadeh et al. |
| 8,799,554 | B1 | 8/2014 | Vincent et al. |
| 2010/0312955 | A1 | 12/2010 | Hwang et al. |
| 2012/0011504 | A1 | 1/2012 | Ahmad et al. |
| 2012/0151127 | A1 | 6/2012 | Lim |
| 2012/0254520 | A1 | 10/2012 | Roh et al. |
| 2013/0254491 | A1 * | 9/2013 | Coleman ............... G06F 12/126 |
| | | | 711/133 |
| 2015/0095919 | A1 | 4/2015 | Vincent et al. |

(Continued)

FOREIGN PATENT DOCUMENTS

CN           102103550 A           6/2011

OTHER PUBLICATIONS

Appendix P, List of IBM Patents or Patent Applications Treated As Related, pp. 1-2, dated Feb. 15, 2016.

(Continued)

*Primary Examiner* — Sean D Rossiter
(74) *Attorney, Agent, or Firm* — Bryan D. Wells

(57) ABSTRACT

A page replacement algorithm is provided. An idle range of memory pages is determined based, at least in part, on indications of references to memory pages in the idle range of memory pages, wherein the idle range of memory pages is a set of one or more memory pages. A first memory page is identified in the idle range of memory page for paging out of memory. The first memory page is identified based, at least in part, on indications of modifications to the memory pages. The first memory page is paged out of memory.

15 Claims, 3 Drawing Sheets

(56) References Cited

U.S. PATENT DOCUMENTS

2016/0112534 A1* 4/2016 Akhtar ............... G06F 12/0811
709/213

OTHER PUBLICATIONS

Liao et al., "Page Replacement Algorithms for Use With Solid-State Drives", U.S. Appl. No. 15/041,077, filed Feb. 11, 2016, 26 pages.
Liu, et al.,"Synergistic Coupling of SSD and Hard Disk for QoS-aware Virtual Memory", 2013 IEEE International Symposium on Performance Analysis of Systems and Software, p. 1-10, DOI: 10.1109/ISPASS.2013.6557143, <http://www.ece.eng.wayne.edu/~sjiang/pubs/papers/liu13_hybridswap.pdf>.

* cited by examiner

PAGE REPLACEMENT ALGORITHMS FOR USE WITH SOLID-STATE DRIVES

BACKGROUND OF THE INVENTION

The present invention relates generally to the field of computer memory management, and more particularly to page replacement algorithms for use with solid-state drives.

Virtual memory is a memory management technique that utilizes hardware and software to map virtual addresses to physical addresses in memory (e.g., random access memory [RAM]). In general, virtual memory appears as a contiguous range of virtual addresses to computer processes. In reality, the virtual addresses can be associated with discontiguous physical addresses. In addition, the physical addresses can be distributed between memory and secondary storage (e.g., a hard disk drive [HDD] or a solid-state drive [SSD]). Distributing physical addresses between memory and secondary storage enables the number of virtual addresses to exceed the number of physical addresses that are available in memory.

Paging is one technique for managing data that is distributed between memory and secondary storage. Computing systems that use the paging technique store data in pages. A page is a fixed-length contiguous block of virtual memory. A page is also the smallest unit of data that is addressed in memory in such systems. A page table associates each page with a virtual address and a physical address. In other words, the page table is a data structure that maps the virtual address of each page to a physical address. The mappings are known as page table entries (PTEs). When a computer process references (i.e., reads/requests access to) or modifies (i.e., overwrites) data in memory, the page table enables the computing system to translate the virtual address into the physical address where the data is stored. In general, a memory management unit (MMU) receives references to virtual addresses and translates the virtual addresses into physical addresses. In some cases, each PTE includes a bit that indicates whether the respective page is stored in memory or secondary storage. If a page is referenced and the bit indicates that the page is stored in secondary storage, a page fault occurs. When this type of page fault occurs, the computing system loads the referenced page into memory from secondary storage. Another type of page fault occurs when an operating system and/or memory management unit must make room in memory to store recently referenced or modified pages. When this type of situation occurs an existing page in physical memory is paged out and written to secondary storage so that memory can store the recently referenced or modified page.

SUMMARY

According to one embodiment of the present disclosure, a method for is provided. The method includes determining, by one or more computer processors, an idle range of memory pages, based, at least in part, on indications of references to memory pages in the idle range of memory pages, wherein the idle range of memory pages is a set of one or more memory pages; identifying, by the one or more computer processors, a first memory page in the idle range of memory pages to page out based, at least in part, on indications of modifications to the memory pages; and paging out of memory, by the one or more computer processors, the identified first memory page.

According to another embodiment of the present disclosure, a computer program product for is provided. The computer program product comprises a computer readable storage medium and program instructions stored on the computer readable storage medium. The program instructions include program instructions to determine an idle range of memory pages, based, at least in part, on indications of references to memory pages in the idle range of memory pages, wherein the idle range of memory pages is a set of one or more memory pages; program instructions to identify a first memory page in the idle range of memory pages to page out based, at least in part, on indications of modifications to the memory pages; and program instructions to page out of memory the identified first memory page.

According to another embodiment of the present disclosure, a computer system for is provided. The computer system includes one or more computer processors, one or more computer readable storage media, and program instructions stored on the computer readable storage media for execution by at least one of the one or more processors. The program instructions include program instructions to determine an idle range of memory pages, based, at least in part, on indications of references to memory pages in the idle range of memory pages, wherein the idle range of memory pages is a set of one or more memory pages; program instructions to identify a first memory page in the idle range of memory pages to page out based, at least in part, on indications of modifications to the memory pages; and program instructions to page out of memory the identified first memory page.

DETAILED DESCRIPTION

Figures 1, 2:
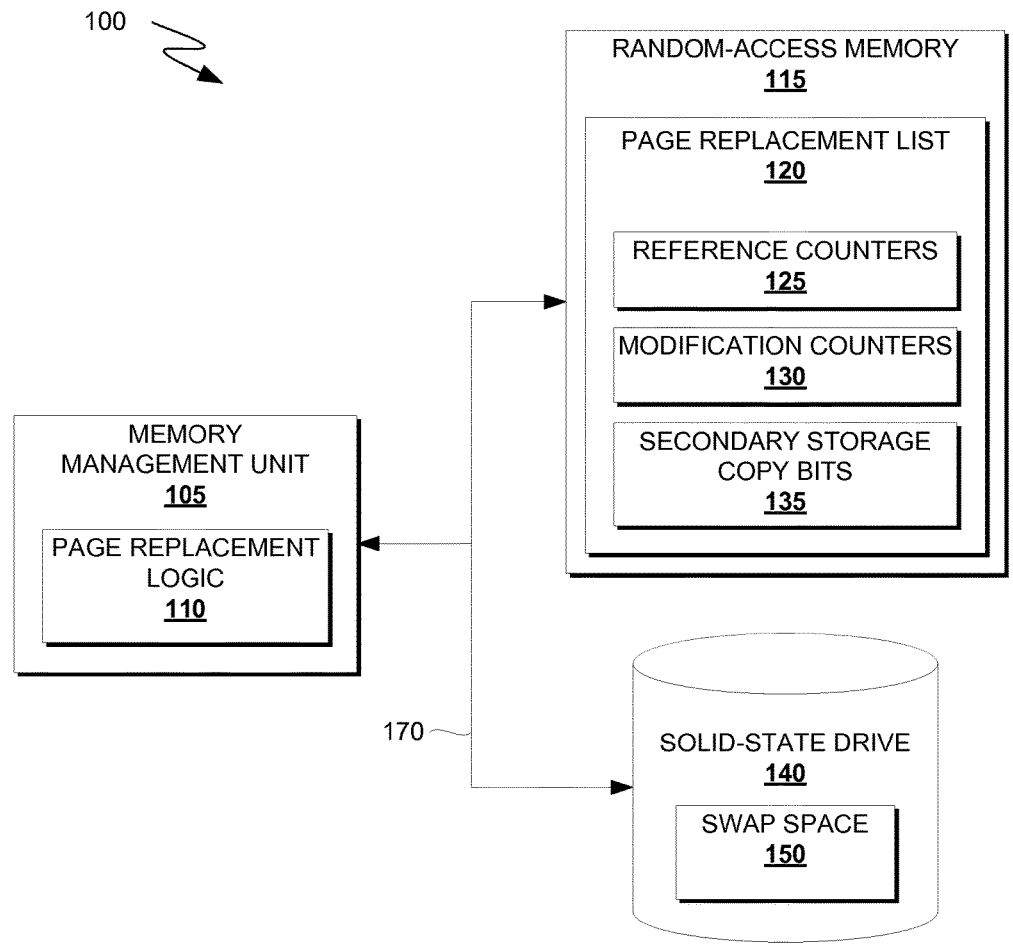
FIG. 1 is a functional block diagram illustrating a computing environment, in accordance with an embodiment of the present disclosure.
FIG. 2 is a table depicting one example of a data structure for use on a computing device within the computing environment of FIG. 1, in accordance with an embodiment of the present disclosure.

Embodiments of the present invention recognize a need to develop page replacement algorithms that are optimized for use with solid-state drives. One advantage of virtual memory is that the number of virtual addresses can exceed the number of physical addresses in memory (e.g., the number of physical addresses in RAM). To accommodate virtual addresses that do not fit in physical memory, secondary storage can store information that is addressed in virtual memory. In general, however, the average read and write times of secondary storage are significantly longer (e.g., an order of magnitude longer) than the average read and write times of memory. Consequently, page faults generally increase latency. In some cases, page replacement algorithms can reduce the latency that is associated with page faults. Page replacement algorithms determine, among other things, which page(s) to page out of memory (i.e., swap out, write to secondary storage) when it is necessary or advantageous to allocate physical addresses in memory to different pages.

The quality of a page replacement algorithm is determined, at least in part, by the latency associated with handling page faults. When a page fault occurs because memory does not have enough free space to store recently referenced and/or modified page(s), the page replacement algorithm determines which page(s) to page out. The latency associated with this type of page fault is determined, at least in part, by the latency associated with writing the paged out page(s) to secondary storage. When a page fault occurs because a referenced and/or modified page is not in memory, the page is paged in (i.e., swapped in, read from secondary storage). The latency associated with this type of page fault is determined, at least in part, by the latency associated with reading the paged out page from secondary storage. In general, page replacement algorithms attempt to determine which pages will minimize page faults and latency if paged out while also minimizing the costs of the algorithm with respect to memory and processor utilization.

In addition to high quality page replacement algorithms, increasing the I/O performance of secondary storage devices can reduce the latency associated with page faults. Flash-based SSDs (e.g., SSDs incorporating NAND flash memory), for example, provide significantly reduced read and write latencies compared to HDDs. Compared to a HDD, a SSD generally reduces latency by a factor of 100-1000 when reading from flash memory and/or writing to an erased block of flash memory (e.g., a block having all bits set to 1 where programming a bit sets the bit to 0). Persons of ordinary skill in the art, however, will understand that a program-erase cycle (i.e., resetting all bits in a bock of flash memory to 1) is generally at least an order of magnitude slower than reading from flash-memory or writing to an erased block of flash memory. In some situations, program-erase cycles (P/E cycles) produce asymmetric read/write performance. One example of such a situation is interspersing read operations between write operations to the same block of flash memory on a SSD that has a relatively small RAM buffer/cache (e.g., various types of enterprise-class SSDs). This type of situation can occur, for example, when managing large database tables. Write latencies can increase by and order of magnitude or more in this situation because a P/E erase cycle must complete before data can be written to the SSD if the cache/buffer cannot store the data to be written and there is insufficient unused space on the SSD to store the data to be written. Read latencies, however, are generally unaffected in this type of situation. One consequence of this asymmetry is that page faults that require a P/E cycle to complete before paging out a page to a SSD are generally more expensive than page faults that merely require paging in a page from a SSD (i.e., reading from, but not writing to, a SSD). While larger RAM caches, garbage-collection algorithms, over-provisioning algorithms, and various other techniques can mitigate the aforementioned asymmetry, these solutions generally increase cost and/or complexity and, in some cases, result in write amplification. Moreover, garbage collection algorithms and over-provisioning algorithms generally become less-effective as the amount of unused space on a SSD decreases. Embodiments of the present disclosure provide a page replacement algorithm that, among other things, is optimized for SSD performance characteristics. While the page replacement algorithm is optimized for use with SSDs, the page replacement algorithm can be used with other forms of computer storage devices, such as HDDs.

In addition, SSD lifetime is generally limited by the number of P/E cycles that a SSD can undergo before performance deteriorates to the point that it is unacceptable. Accordingly, it is advantageous to minimize the number of P/E cycles induced by page replacement algorithms, regardless of any reductions with respect to page replacement algorithm latencies. Embodiments of the present disclosure provide a page replacement algorithm that, among other things, reduces the number of induced P/E cycles.

The present disclosure will now be described in detail with reference to the Figures. FIG. 1 is a functional block diagram illustrating a computing environment, in accordance with an embodiment of the present disclosure. For example, FIG. 1 is a functional block diagram illustrating computing environment 100. Computing environment 100 includes memory management unit 105, random access memory 115, and solid-state drive 140 connected over bus 170. Memory management unit 105 executes page replacement logic 110, as discussed in greater detail with respect to FIG. 3.

In various embodiments, computing environment 100 illustrates one portion a computing device that can be a standalone device, a server, a laptop computer, a tablet computer, a netbook computer, a personal computer (PC), or a desktop computer. In another embodiment, computing environment 100 illustrates one portion of a computing system utilizing clustered computers and components to act as a single pool of seamless resources. In general, computing environment 100 can be implemented in any computing device or a combination of devices where memory management unit 105 is communicatively connected to random access memory 115 and solid-state drive 140, and where memory management unit 105 has access to and/or is capable of executing page replacement logic 110. Computing environment 100 can include internal and external hardware components, as depicted and described in further detail with respect to FIG. 4.

Figure 4:
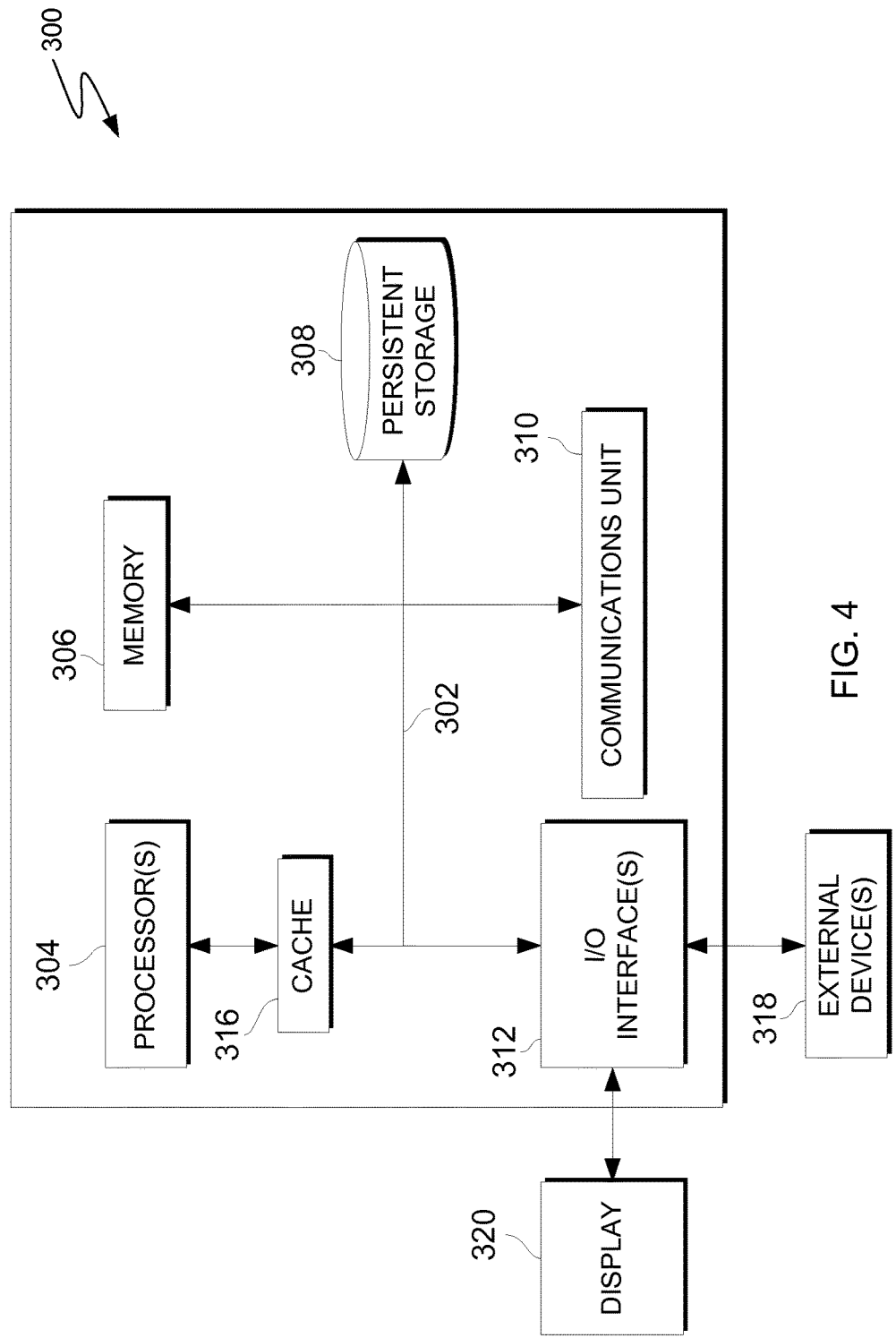
FIG. 4 is a block diagram of components of a computing device executing operations for memory management, in accordance with an embodiment of the present disclosure.

In one embodiment, memory management unit 105 is implemented as part of a central processing unit (CPU) (e.g., processor(s) 304 of FIG. 4). In another embodiment memory management unit 105 is implemented as a discrete integrated circuit that is connected to a central processing unit (e.g., processor(s) 304 of FIG. 4) over a bus (e.g., bus 170, which, in some embodiments, is a portion of communications fabric 302). In general, memory management unit 105 is a computing device component through which references to memory pass and that executes page replacement logic 110. In some embodiments, memory management unit 105 translates virtual memory addresses to physical memory and manages a page table and/or translation lookaside buffer. In embodiments where memory management unit 105 manages a page table, random access memory 115 stores the page table. In embodiments where memory management unit 105 is implemented as part of a CPU (e.g., processor(s) 304), random access memory 115 is system memory (e.g., memory 306). In one example of an embodiment where memory management unit 105 is a discrete integrated circuit, random access memory 115 is separate from system memory and packaged with memory management unit 105. In embodiments where memory management unit 105 manages a translation lookaside buffer, a cache stores the translation lookaside buffer. In embodiments where memory management unit 105 is implemented as part of a CPU (e.g., processor(s) 304), a cache that is packaged with the CPU (e.g., cache 316) stores the translation lookaside buffer. In one example of an embodiment where memory management unit 105 is a discrete integrated circuit, the translation lookaside buffer is stored in a cache that is separate from the system cache and packaged with memory management unit 105.

Random access memory 115 is volatile memory (e.g., dynamic random access memory) that stores, among other things, page replacement list 120. In some embodiments, random access memory 115 also stores a page table. In one example of such an embodiment, the page table includes page replacement list 120. Page replacement list 120 is a data structure that stores information relating to pages in virtual memory. As will be discussed in greater detail with respect to FIG. 2, page replacement list 120 includes information relating to references to pages in virtual memory (e.g., reference counters 125), modifications to pages in virtual memory (e.g., modification counters 130), and in some embodiments, information relating to copies of pages that are stored in secondary storage (e.g., secondary storage copy bits 135).

Solid-state drive 140 is a computer storage device that includes non-volatile computer memory. In general, solid-state drive 140 is a computer storage device in which erasing data reduces the lifespan of the device and is slower than reading data from or writing data to the device. In some embodiments, solid-state drive 140 is a flash-based SSD that includes NAND flash memory. In other embodiments, solid-state drive 140 is a collection of computer storage devices that function as a single logical volume. In various examples of such embodiments, solid-state drive 140 is as a plurality of concatenated drives, a plurality of spanned drives, a resilient array of independent disks (RAID), just a bunch of disks (JBOD), a massive array of idle drives (MAID), or another configuration of computer storage devices. In the embodiment depicted in FIG. 1, solid-state drive 140 includes swap space 150. Swap space 150 is the portion of solid-state drive 140 that is reserved for storing pages that are paged out from random access memory 115.

FIG. 2 is a table that depicts one example of page replacement list 120, in accordance with an embodiment of the present disclosure. Page replacement list 120 is a data repository that may be written to and read by page replacement logic 110. Page replacement list 120 relates pages that are addressed in physical memory (e.g., page 155, page 160, and page 165 as depicted in FIG. 2) to information that describes references and modifications to the pages. In FIG. 2, for example, page replacement list 120 includes reference counters 125 and modification counters 130. In FIG. 2, reference counters 125 describe references to pages 155, 160, and 165, and modification counters 130 describe modifications to pages 155, 160, and 165. In some embodiments, like the example depicted in FIG. 2, page replacement list 120 also includes secondary storage copy bits 135. In FIG. 2, secondary storage copy bits 135 respectively indicate if a copy of pages 155, 160, or 165 is stored in swap space 150 on solid-state drive 140. In some embodiments, memory management unit 105 manages a page table that include page replacement list 120.

In general, reference counters 125 describe how recently and/or how frequently a page in physical memory has been referenced over a period of time. Similarly, modification counters 130 describe how recently and/or how frequently a page in physical memory has been modified over a period of time. In various embodiments, memory management unit 105 implements reference counters 125 and modification counters 130 using an algorithm that is based, at least in part, on a not recently used (NRU) algorithm, a least recently used (LRU) algorithm, a not frequently used (NFU) algorithm, an aging algorithm, or another page replacement algorithm. In some embodiments, page replacement logic 110 utilizes a first algorithm for reference counters 125 and a different, second algorithm for modification counters 130.

In embodiments like the example depicted in FIG. 2, page replacement list 120 is a data structure that allocates n bits of data to each page in physical memory (i.e., a data structure that includes bits $R_{n-1}$ through $R_0$ for each page in page replacement list 120). In embodiments that include secondary storage copy bits 135, reference counters 125 utilize bits $R_{n-1}$ through $R_{n-m}$, and modification counters 130 utilize bits $R_m$ through $R_1$, wherein modification counters 130 are allocated m bits of data and n>m>0. Secondary storage copy bits 135 utilize bit $R_0$ in the example depicted in FIG. 2. In embodiments that do not include secondary storage copy bits 135, reference counters 125 utilize bits $R_{n-1}$ through $R_m$, and modification counters 130 utilize bits $R_{m-1}$ through $R_0$. In some embodiments, reference counters 125 and modification counters 130 utilize an equal number of bits. In other embodiments, reference counters 125 utilize a greater or lesser number bits than modification counters 130. In addition, the arrangement of reference counters 125, modification counters 130, and secondary storage copy bits 135 within the n bit data structure is not a limitation of the present disclosure. In some embodiments, page replacement logic 110 manages a plurality of page replacement lists, wherein reference counters 125 and modification counters 130 are associated with different page replacement lists. In such embodiments, secondary storage copy bits 135 can be associated with any one, or more than one, of the plurality of page replacement lists.

In the example depicted in FIG. 2, reference counters 125 and modification counters 130 are based, at least in part, on an aging algorithm. In this example, page replacement logic 110 updates reference counters 125 and modifications counters 130 at regular intervals (e.g., a count of seconds or a count of CPU clock ticks). Bits $R_{n-1}$ and $R_m$ are associated with the most recent interval. If a page was referenced during the most recent interval, a respective $R_{n-1}$ bit is set to one. If a page was not referenced during the most recent interval, a respective $R_{n-1}$ bit is set to zero. If a page was modified during the most recent interval, a respective $R_m$ bit is set to one. If a page was not modified during the most recent interval, a respective $R_m$ bit is set to one zero. Persons of ordinary skill in the art will understand that binary numbers describe the values of bits $R_{n-1}$-$R_{n-m}$ and bits $R_m$-$R_1$ at a point in time. When page replacement logic 110 updates reference counters 125 and modification counters 130, it divides the binary numbers that describe bits $R_{n-1}$-$R_{n-m}$ and bits $R_m$-$R_1$ by two and adds respective $R_{n-1}$ and $R_m$ bits to the left of the quotients. Accordingly, the reference counter and the modification counter for a particular page decrease in value if the page is not respectively referenced or modified during the most recent interval. In effect, bits $R_{n-m}$ and $R_1$ are erased, the remaining bits in reference counters 125 and modification counters 130 are shifted one bit to the right, and bits $R_{n-1}$ and $R_m$ are set in accordance with any references and/or modifications during the most recent interval. In FIG. 2, for example, the reference and modification counters for page 155 indicate that page 155 was referenced during the second and fourth most recent intervals and that page 155 was modified during the first and fourth most recent intervals. As will be described in more detail with respect to FIG. 3, the value of the numbers that describe bits $R_{n-1}$-$R_{n-m}$ and bits $R_m$-$R_1$ determine, at least in part, which pages are swapped out.

In the embodiment depicted in FIGS. 1 and 2, page replacement list 120 includes secondary storage copy bits 135. In the embodiment depicted in FIG. 2, secondary storage copy bits 135 are associated with bits $R_0$. If a copy of a page exists in secondary storage (e.g., swap space 150 of solid-state drive 140), page replacement logic 110 sets the respective $R_0$ bit to one. If a copy of a page does not exist in secondary storage, page replacement logic 110 sets the respective $R_0$ bit to zero. If a page that is stored in secondary storage is modified, page replacement logic 110 sets the respective $R_0$ bit to zero. Persons of ordinary skill in the art will understand that a page in secondary storage is "dirty" if a program modifies it in virtual memory. "Dirty" pages must overwritten or erased (and stored in memory) because they are no longer valid (i.e., accurate). In FIG. 2, for example, each of pages 155, 160, and 165 have been modified during at least one of the last four intervals, and therefore, these pages each have a secondary storage copy bit that is set to zero.

Figure 3:
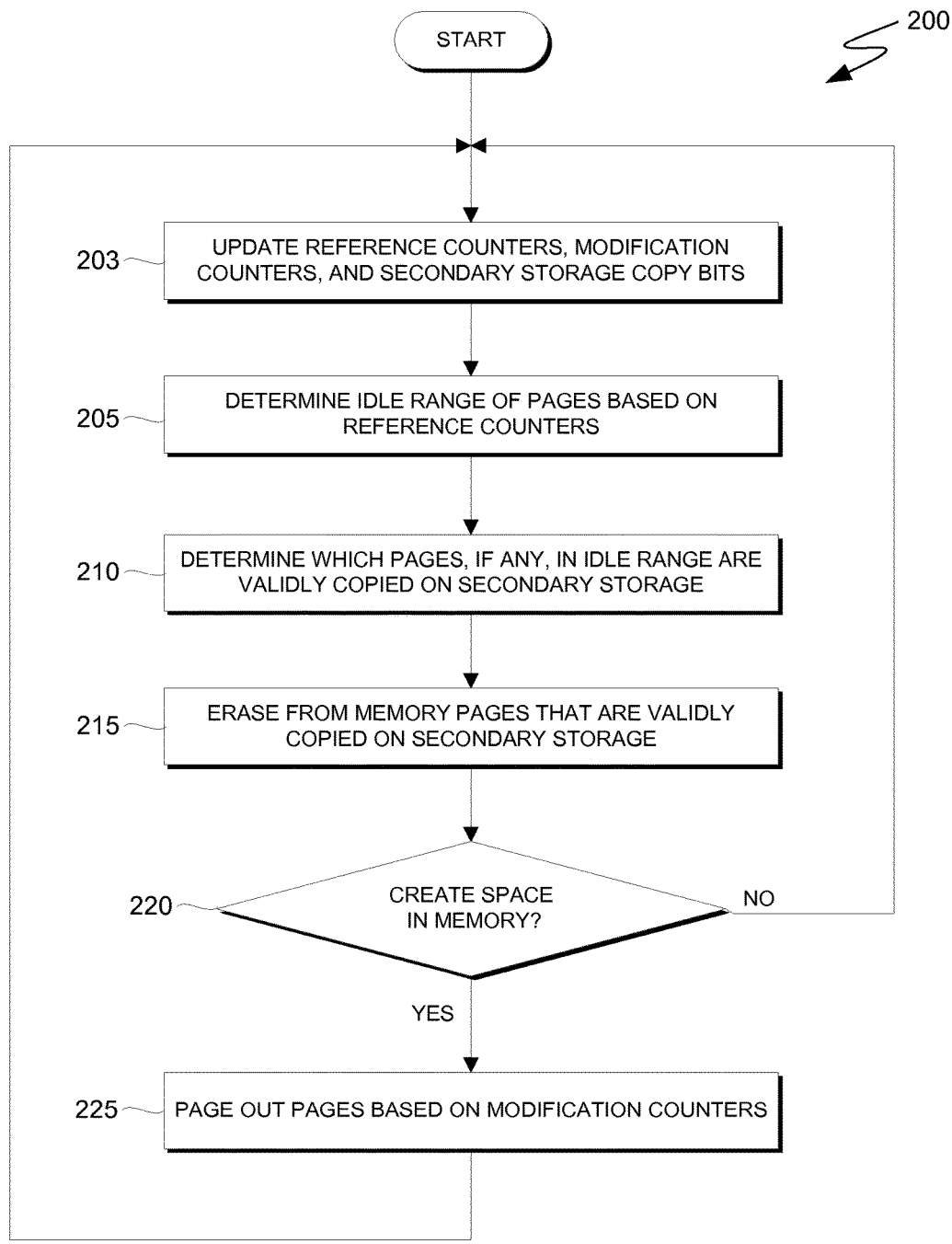
FIG. 3 is a flowchart depicting operations for computer memory management, in accordance with an embodiment of the present disclosure.

FIG. 3 is a flowchart depicting operations 200 of page replacement logic 110 within computing environment 100, in accordance with an embodiment of the present disclosure. In one embodiment, operations 200 are performed when memory management unit 105 needs to make room in random access memory 115 for a recently referenced or modified page. In another embodiment, operations 200 are performed prior to a need to make room in random access memory 115 for a recently referenced or modified page (i.e., in anticipation of having to make room for a recently referenced or modified page).

FIG. 3 depicts an embodiment of page replacement logic 110 for use with the embodiment of page replacement list 120 that is depicted in FIG. 2. Persons of ordinary skill in the art will understand that operations 200 of page replacement logic 110, as depicted in FIG. 3, can be modified to function with other embodiments of page replacement list 120.

In operation 203, page replacement logic 110 updates reference counters 125, modifications counters 130, and/or secondary storage copy bits 135 based, at least in part, on references and/or modifications to pages in page replacement list 120, as described herein with respect to FIG. 2. In some embodiments (e.g., embodiments where reference counters 125 and modifications counters 130 are LRU lists), none of reference counters 125, modifications counters 130, and secondary storage copy bits 135 are updated if no page is referenced, modified, or copied to secondary storage during the most recent interval.

In operation 205, page replacement logic 110 determines an idle range of pages based, at least in part, on reference counters 125. In some embodiments, the idle range of pages is determined based, at least in part, on a threshold value of reference counters 125. In one example of such embodiments, the idle range of pages includes pages in memory that are associated with reference counters having values below the threshold value. In combination with reference counters 125, as described with respect to FIG. 2, this example of page replacement logic 110 includes the least recently referenced pages in the idle range of pages. If for example, the threshold value is 1000, the idle range of pages would include pages 155 and 165. Even though pages 160 and 155 were both referenced twice during the four intervals, this embodiment prioritizes less recently referenced pages, even if more frequently referenced, over more recently referenced pages for paging out. In other embodiments, the idle range of pages is a number of ordered pages, wherein the number is arbitrary or based on a percentage of the pages in memory. Persons of ordinary skill in the art will understand that it possible to order pages by listing the pages according to one or more parameters of a page replacement algorithm. In one such embodiment that utilizes reference counters 125 as described with respect to FIG. 2, pages are ordered according to the value of the respective reference counters. In this embodiment, the idle range of pages includes a range of n pages that is bounded by the least recently reference page and the $n^{th}$ least recently referenced page.

In operation 210, page replacement logic 110 determines which pages, if any, in the idle range are validly copied on secondary storage (e.g., swap space 150 of solid-state drive 140). As described herein with respect to FIG. 2, a page is validly copied to secondary storage if the page has not been modified since being copied to secondary storage. In embodiments that include secondary storage copy bits 135, page replacement logic 110 determines if the secondary storage copy bits of pages in the idle range have a value of one in operation 210. In embodiments that do not include secondary storage copy bits 135, operation 210 is omitted.

In operation 215, page replacement logic 110 erases from memory pages that are validly copied on secondary storage. In some embodiments, page replacement logic 110 erases from memory all pages that are validly copied on secondary storage. In other embodiments, page replacement logic 110 erases from memory only a portion of the pages that are validly copied on secondary storage. As described herein, there are situations in which SSD read/write performance is asymmetric, such as when a P/E cycle must complete before a write can be completed. In addition, the latency associated with paging in a page from a SSD is significantly lower than the latency associated with paging in a page from a HDD (e.g., two to three orders of magnitude lower) and the latency associated with waiting for a P/E cycle to complete (e.g., one to two orders of magnitude lower in some circumstances). In some embodiments, it is advantageous to erase from memory pages that are validly copied on a SSD in order to create free space in memory. While erasing such pages can result in a page fault that requires paging in the erased page from the SSD, this type of page fault is generally less expensive than a page fault that requires a P/E cycle to complete before there is room to store a recently referenced and/or modified page in memory. In embodiments that do not include secondary storage copy bits 135, operation 215 is omitted.

In decision 220, page replacement logic 110 determines if it should create space in memory to store recently referenced and/or modified page(s). In some embodiments, page replacement logic 110 creates space in memory because there is not enough free space in memory to store the recently referenced and/or modified page(s). In other embodiments, page replacement logic 110 creates space in memory because the amount of free space in memory is below a threshold. In some circumstances, it is advantageous to anticipatorily page out pages from memory to avoid having to wait for a P/E cycle, for example, to complete before recently referenced and/or modified page(s) can be stored in memory. If page replacement logic 110 determines that it should create space in memory (decision 220, YES branch), page replacement logic 110 executes operation 225. If page replacement logic 110 determines that it should not create space in memory (decision 220, NO branch), page replacement logic executes operation 203.

In operation 225, page replacement logic 110 pages out of memory one or more page(s) based, at least in part, on the modification counter(s) of the pages. To determine which pages to page out of memory, page replacement logic 110 prioritizes pages for paging out based, at least in part, on the modification counters of the pages. In some embodiments, page replacement logic 110 rearranges page replacement list 120, or another list that lists pages in the idle range, based on modification counters 130, wherein the page replacement logic 110 identifies pages to page out based on the positions of the pages in the list. In one example of such embodiments, page replacement logic 110 arranges pages in page replacement list 120 based on the value of the respective modification counters (e.g., in order from low to high modification counter values). In this example, page replacement logic 110 pages out of memory pages in the order that they appear in page replacement list 120, beginning with the page having the modification counter with the lowest value. In other embodiments, page replacement logic 110 populates a data structure that associates a priority value (i.e., a binary number) with each page in the idle range based on the value of the respective modification counters. In one example of such an embodiment, page replacement logic 110 identified pages that have the highest priority value and pages out of memory pages in order of priority value, beginning with the page having the highest priority value (i.e., the page having a modification counter with the lowest value in embodiments where the priority value is inversely proportional to the value of the modification counter). In yet other embodiments, page replacement logic 110 compares the values of modification counters between pages in the idle range until it identifies the page having the modification counter with the lowest value, which is then paged out (i.e., modification counters 130 represent priorities for page out of the respective pages). In such embodiments, page replacement logic 110 repeats the comparison between the remaining pages to identify the page having the modification counter with the next lowest value. Persons of ordinary skill in the art will understand that, in prioritizing pages in the idle range, the aforementioned embodiments utilize memory and processor resources to different extents and are optimal under different circumstances.

Page replacement logic 110 prioritizes pages in the idle range to, at least in part, reduce page fault latency in some situations and minimize the number of P/E cycles that page replacement logic 110 induces (i.e., maximize SSD lifespan). In general, less recently and/or less frequently modified pages have a higher priority for paging out than pages that are more recently and/or more frequently modified, in accordance with the page replacement algorithm utilized to generate modification counters 130. In the embodiment depicted in FIG. 2, for example, page 165 has a higher priority than page 160, and page 160 has a higher priority than page 155. While each of page 155 and page 160 were modified twice during the four intervals depicted in FIG. 2, this embodiment prioritizes less recently modified pages, even if more frequently modified, over more recently modified pages for paging out. The embodiment depicted in FIG. 2 assumes that a more recently modified page is more likely to be modified in the future than a less recently modified page. Other embodiments utilize different assumption(s) to page out the pages that are the least likely to be modified in the future. Page replacement logic 110 pages out the pages that are the least likely to be modified to, at least in part, minimize the number of P/E cycles that page replacement logic 110 induces. When a program modifies a page, the page is generally overwritten on secondary storage or erased from secondary storage if the modified page is stored in memory. Both of these operations induce at least one P/E cycle on a SSD. As described herein, P/E cycles increase page fault latency in some situations, and reduce the number of P/E cycles that remain in a SSD lifespan. Consequently, minimizing the number of P/E cycles that page replacement logic 110 induces can reduce page fault latency and maximize SSD lifespan.

FIG. 4 depicts computer system 300. Computer system 300 is one example of a computing device that is capable of executing page replacement logic 110. Computer system 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of processors 304 by holding recently accessed data and data near accessed data from memory 306.

Program instructions and data used to practice embodiments of the present invention may be stored in persistent storage 308 for execution by one or more of the respective processors 304 via cache 316 and one or more memories of memory 306. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
determining, by one or more computer processors, an idle range of memory pages, based, at least in part, on indications of references to memory pages in the idle range of memory pages, wherein the idle range of memory pages is a set of one or more memory pages;
identifying, by the one or more computer processors, a first memory page in the idle range of memory pages to page out based, at least in part, on indications of modifications to the memory pages, wherein:
the indications of modifications to memory pages are a plurality of modification counters,
each memory page is associated with a modification counter,
the first memory page is identified by comparing a first modification counter that is associated with the first memory page to a second modification counter that is associated with a second memory page, and
the first modification counter has a lower value than the second modification counter;
paging out of memory, by the one or more computer processors, the identified first memory page; and
updating, by the one or more computer processors, the plurality of modification counters in accordance with an aging algorithm.

2. The method of claim 1, wherein the indications of references to memory pages are a plurality of reference counters, and wherein each memory page in memory is associated with a reference counter.

3. The method of claim 2, further comprising:
updating, by the one or more computer processors, the plurality of reference counters in accordance with an aging algorithm.

4. The method of claim 1, further comprising:
paging out of memory, by the one or more computer processors, a third memory page in the idle range of memory pages based, at least in part, on a copy of the third memory page that is stored on a computer storage device that includes non-volatile computer storage media, and wherein the third memory page is paged out before the first memory page due, at least in part, to the copy of the third memory page.

5. The method of claim 1, wherein the first memory page is paged out to a solid-state drive.

6. A computer program product, the computer program product comprising:
a computer readable storage medium and program instructions stored on the computer readable storage medium, the program instructions comprising:
program instructions to determine an idle range of memory pages, based, at least in part, on indications of references to memory pages in the idle range of memory pages, wherein the idle range of memory pages is a set of one or more memory pages;
program instructions to identify a first memory page in the idle range of memory pages to page out based, at least in part, on indications of modifications to the memory pages, wherein:
the indications of modifications to memory pages are a plurality of modification counters,
each memory page is associated with a modification counter,
the first memory page is identified by comparing a first modification counter that is associated with the first memory page to a second modification counter that is associated with a second memory page, and
the first modification counter has a lower value than the second modification counter;
program instructions to page out of memory the identified first memory page; and
program instructions to update the plurality of modification counters in accordance with an aging algorithm.

7. The computer program product of claim 6, wherein the indications of references to memory pages are a plurality of reference counters, and wherein each memory page in memory is associated with a reference counter.

8. The computer program product claim 7, the program instructions further comprising:
program instructions to update the plurality of reference counters in accordance with an aging algorithm.

9. The computer program product of claim 6, the program instructions further comprising:
program instructions to page out of memory a third memory page in the idle range of memory pages based, at least in part, on a copy of the third memory page that is stored on a computer storage device that includes non-volatile computer storage media, and wherein the third memory page is paged out before the first memory page due, at least in part, to the copy of the third memory page.

10. The computer program products of claim 6, wherein the first memory page is paged out to a solid-state drive.

11. A computer system, the computer system comprising:
one or more computer processors;
one or more computer readable storage media;
program instructions stored on the computer readable storage media for execution by at least one of the one or more processors, the program instructions comprising:
program instructions to determine an idle range of memory pages, based, at least in part, on indications of references to memory pages in the idle range of memory pages, wherein the idle range of memory pages is a set of one or more memory pages, wherein:
the indications of modifications to memory pages are a plurality of modification counters,
each memory page is associated with a modification counter,
the first memory page is identified by comparing a first modification counter that is associated with the first memory page to a second modification counter that is associated with a second memory page, and
the first modification counter has a lower value than the second modification counter;
program instructions to page out of memory the identified first memory page; and
program instructions to update the plurality of modification counters in accordance with an aging algorithm.

12. The computer system of claim 11, wherein the indications of references to memory pages are a plurality of reference counters, and wherein each memory page in memory is associated with a reference counter.

13. The computer system of claim 12, the program instructions further comprising:
  program instructions to update the plurality of reference counters in accordance with an aging algorithm.

14. The computer system of claim 11, the program instructions further comprising:
  program instructions to page out of memory a third memory page in the idle range of memory pages based, at least in part, on a copy of the third memory page that is stored on a computer storage device that includes non-volatile computer storage media, and wherein the third memory page is paged out before the first memory page due, at least in part, to the copy of the third memory page.

15. The computer system of claim 11, wherein the first memory page is paged out to a solid-state drive.

\* \* \* \* \*